United States Patent [19]

Fujishima et al.

[11] Patent Number: 5,734,836
[45] Date of Patent: Mar. 31, 1998

[54] METHOD OF PREVENTING DOUBLE DATA RECEPTION IN SELECTIVE RECEPTION COMMUNICATION SYSTEM

[75] Inventors: Hisashi Fujishima; Kazuhiro Iitsuka; Youichi Imaizumi, all of Kawasaki, Japan

[73] Assignee: Fujitsu Limited, Kawasaki, Japan

[21] Appl. No.: 328,059

[22] Filed: Oct. 24, 1994

[30] Foreign Application Priority Data

May 18, 1994 [JP] Japan .......................... 6-103708

[51] Int. Cl.$^6$ .......................................... G06F 7/00
[52] U.S. Cl. .......................... 395/200.81; 395/200.78
[58] Field of Search ................ 395/200.21, 200.19, 395/200.81, 200.66, 200.78, 200.76, 670, 551, 200.69; 370/85.4, 16.1, 85.19; 510/84; 371/47.1; 369/290.9

[56] References Cited

U.S. PATENT DOCUMENTS

| | | | |
|---|---|---|---|
| 4,549,297 | 10/1985 | Nishimoto | 371/33 |
| 4,577,312 | 3/1986 | Nash | 370/84 |
| 4,816,989 | 3/1989 | Finn et al. | 395/200.19 |
| 5,130,987 | 7/1992 | Flammer | 370/103 |
| 5,228,029 | 7/1993 | Kotzin | 370/95.1 |
| 5,243,335 | 9/1993 | Kato et al. | 370/85.5 |
| 5,477,531 | 12/1995 | McKee et al. | 370/17 |
| 5,577,196 | 11/1996 | Peer | 395/783.19 |

*Primary Examiner*—Mehmet B. Geckil
*Attorney, Agent, or Firm*—Staas & Halsey

[57] ABSTRACT

A selective reception communication system operates to prevent a double data reception from occurring owing to the difference between times at which data are transmitted over transmission paths when switching is effected from one transmission path to another due to a transmission path or node fault. Frame data transmission delay times required for data to reach a destination node over the transmission paths are established in every predetermined period of time. For data communication between nodes, frame data transmitted over the transmission path are given time delays corresponding to the differences between the established frame data transmission delay times and the longest one of the frame data transmission delay times. The frame data which have been transmitted over the different transmission paths now arrive simultaneously at the destination node where switching is made between the transmission paths.

9 Claims, 10 Drawing Sheets

| NODE | A | D | C |
|---|---|---|---|
| SYSTEM 0 | $\gamma \times 2$ | $\gamma \times 1$ | $\gamma \times 0$ |
| SYSTEM 1 | $\gamma \times 0$ | $\gamma \times 1$ | $\gamma \times 2$ |

METHOD OF PREVENTING DOUBLE DATA RECEPTION IN SELECTIVE RECEPTION COMMUNICATION SYSTEM

BACKGROUND OF THE INVENTION (1) Field of the Invention

The present invention relates to the prevention of a double data reception in a selective reception communication system, and more particularly to a method of preventing a double reception of data from occurring upon switching between transmission paths in a selective reception communication system in which a receiver selectively receives frame data transmitted through a plurality of transmission paths.

(2) Description of the Related Art

Selective reception communication systems have a plurality of different transmission paths connected through nodes. When frame data are transmitted from a transmitting node to a receiving node, the same frame data are supplied simultaneously to the plural transmission paths, and a receiver selects one of the transmission paths to receive the frame data which have been transmitted through the selected transmission path. In the event of a transmission path fault or a node fault, the receiver switches to another transmission path to receive the frame data as before.

Figure 9:
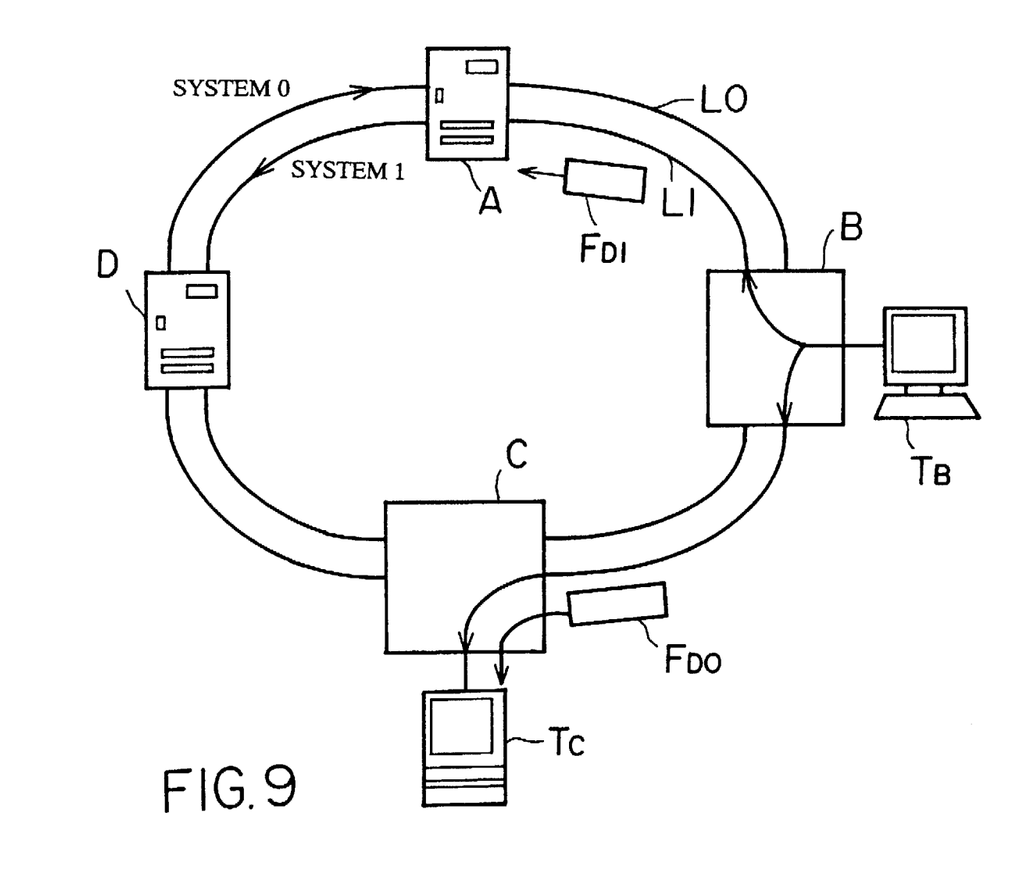
FIG. 9 is a diagram of a conventional selective reception loop-shaped LAN.

FIG. 9 of the accompanying drawings shows a conventional selective reception loop-shaped local area network (LAN). For the sake of brevity, the local area network has two loop-shaped transmission paths, i.e., a transmission path L0 of system 0 and a transmission path L1 of system 1, with four nodes A, B, C, D on the transmission paths. At least one terminal is connected to each of the nodes A, B, C, D. In the illustrated example, only terminals $T_B$, $T_C$ connected respectively to the nodes B, C are shown.

For transferring data from the terminal $T_B$ to the terminal $T_C$ in the illustrated selective reception loop-shaped LAN, the same data are carried onto data frames $F_{D0}$, $F_{D1}$ which have circulated, at the node B. The data frame $F_{D0}$ passes over the transmission path L0 to the node C, and the data frame $F_{D1}$ passes over the transmission path L1 through the nodes A, D to the node C. If the node C has switched to receive data from the transmission path L0 of system 0, then only the data frame $F_{D0}$ that has been transmitted over the transmission path L0 is received by the terminal $T_C$.

Figure 10:
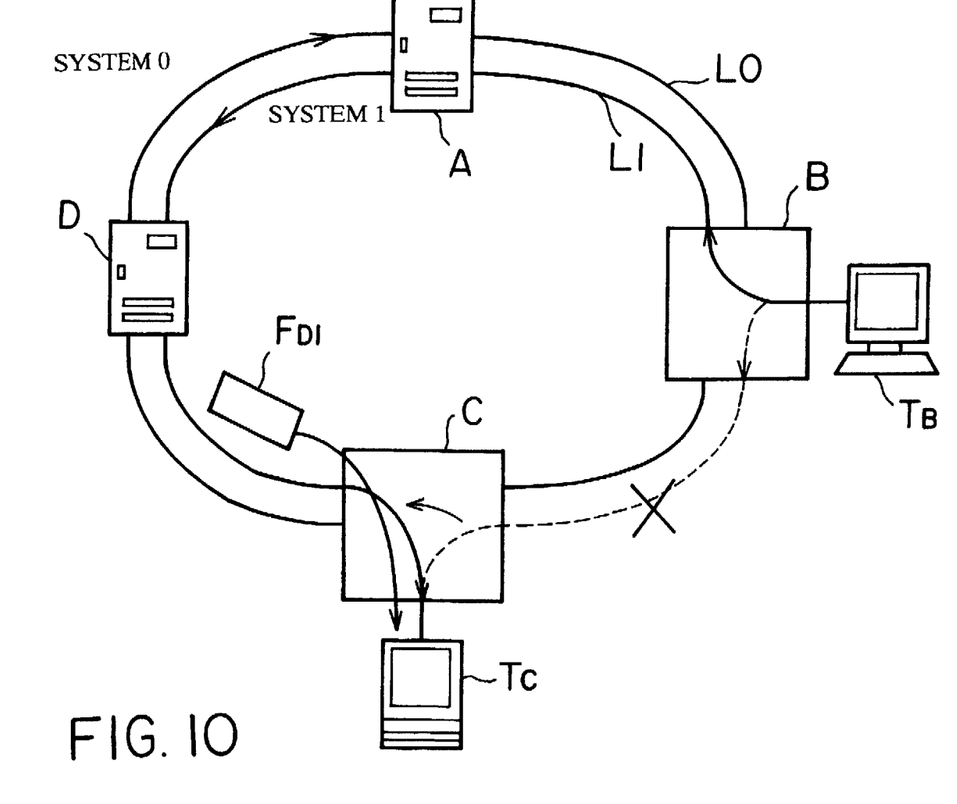
FIG. 10 is a diagram illustrating a process of receiving data in the event of a fault of the loop-shaped LAN.

FIG. 10 of the accompanying drawings illustrates a process of receiving data in the event of a fault of the loop-shaped LAN. If a fault occurs at a position marked by "X" in the transmission path L0 between the nodes B, C, or at another node (not shown), if any, positioned between the nodes B, C, while the transmission path L0 of system 0 is being selected for data reception by the node C, then the received data contain a fault. When a fault is found in the received data, the node C switches from the transmission path L0 of system 0 to the transmission path L1 of system 1 to receive the data frame FD1 that has been transmitted over the transmission path L1 of system 1. The terminal $T_C$ can thus continuously receive the data transmitted from the terminal $T_B$.

When data are transmitted from the node B to the node C in the conventional selective reception communication system, the same data pass through different numbers of nodes over the transmission path L0 of system 0 and the transmission path L1 of system 1. The times required for the data to be transmitted through the transmission paths L0, L1 are almost negligible. However, it takes some time for each node to transmit data to a downstream node after it has received the data from an upstream node. Specifically, it takes about 134.6 microseconds for each node to transmit data. Therefore, a data frame reaches the node C in a different period of time depending on how many nodes are present in the path from the node B to the node C. In the example shown in FIG. 9, since no node exists on the transmission path L0 of system 0 between the nodes B, C and two nodes exist on the transmission path L1 of system 1 between the nodes B, C, the difference between the times of arrival of the data at the node C is about 269.2 microseconds.

As described above, there is a time difference when the same data transmitted over the transmission path L0 of system 0 and the transmission path L1 of system 1 reach the destination node. Consequently, when the node C detects a fault in the transmission path L0 while receiving data over the transmission path L0, and switches from the transmission path L0 with no intervening node to the transmission path L1 with two intervening nodes, the node C receives the same data again, resulting in a double data reception.

Any communication protocol basically includes a control process for a data receiving terminal to request retransmission of data in the event that some data item is missing from transmitted data. However, some communication protocols do not have a control process for a data transmission procedure with respect to a "double data reception." That is, there are communication protocols which fail to control a receiving terminal to request retransmission of data when a data fault occurs due to a double data reception. Such a terminal is problematic in that when a double data reception happens, a data fault occurs, and the terminal is no longer capable of communicating with other terminals.

SUMMARY OF THE INVENTION

It is an object of the present invention to provide a method of preventing a double data reception upon switching between transmission paths in a selective reception communication system.

Another object of the present invention is to provide a method of measuring a frame data transmission delay time produced among a plurality of transmission paths upon communication between nodes.

Still another object of the present invention is to provide a method of controlling frame data transmitted over a plurality of transmission paths to arrive simultaneously at a receiving node.

According to the present invention, there is provided a method of preventing a double data reception from occurring in a selective reception communication system having a plurality of transmission paths including 0 or more nodes between a transmitting node and a receiving node, for transmitting frame data from the transmitting node over the transmission paths, and selecting and receiving the frame data from one of the transmission paths at the receiving node, comprising the steps of establishing frame data transmission delay times between nodes over the transmission paths, and giving the frame data transmitted over the transmission paths times delays corresponding to the differences between the frame data transmission delay times established between the nodes over the transmission paths and the longest one of the frame data transmission delay times.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
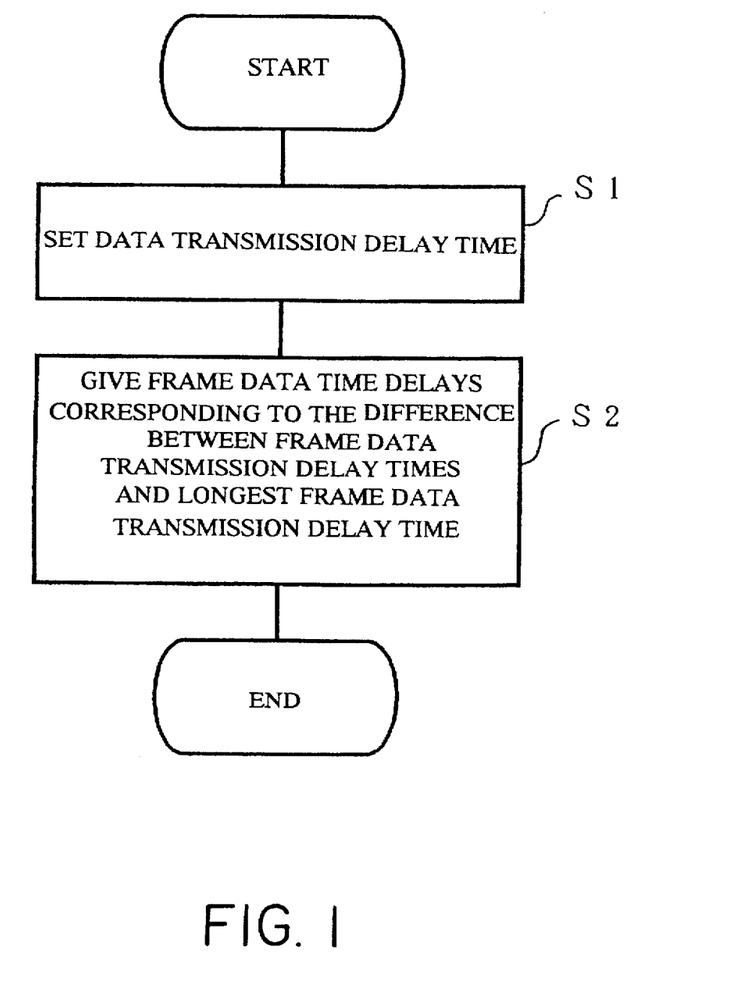
FIG. 1 is a flowchart illustrating the principles of the present invention.

FIG. 1 shows the principles of the present invention. The present invention is directed to a method of preventing a double data reception upon switching between transmission paths in a selective reception communication system wherein the same frame data are transmitted over the transmission paths, and a receiver selects and receives the frame data transmitted over either one of the transmission paths.

As shown in FIG. 1, frame data transmission delay times for communication between nodes are established with respect to respective transmission paths in a step S1. Then, the frame data transmitted over the respective transmission paths are given time delays corresponding to the differences between the established frame data transmission delay times of the frame data up to a destination node and the longest of the established frame data transmission delay times.

Since the frame data transmitted over the respective transmission paths are given time delays corresponding to the differences between the established frame data transmission delay times of the frame data and the longest of the established frame data transmission delay times for communication between nodes, the frame data transmitted over the respective transmission paths immediately before switching between the transmission paths arrive substantially simultaneously at the receiving node. Therefore, even if the transmission path which is being selected for data reception or a node on that transmission path is subjected to a fault, and switching between the transmission paths is effected due to the detection of a received data fault, it is possible to prevent a double data reception reliably.

Figure 2:
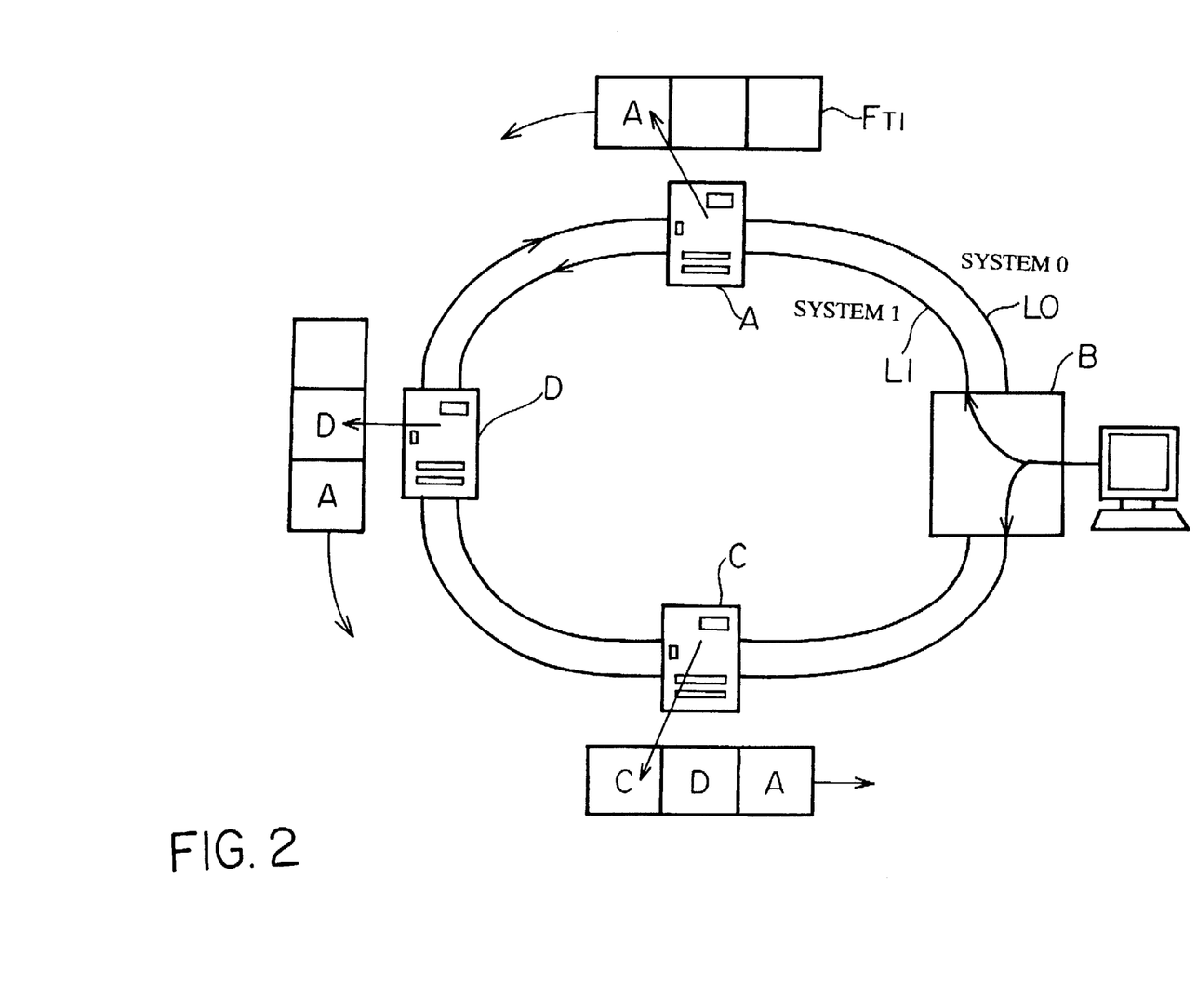
FIG. 2 is a diagram illustrating a method of measuring a data transmission delay time.

FIG. 2 illustrates a method of measuring a data transmission delay time. For the sake of brevity, it is assumed that a selective reception communication system comprises a 156-Megabit high-speed optical LAN composed of four nodes A, B, C and D which are connected in a loop by a transmission path L0 of system 0 and a transmission path L1 of system 1. In this method, the node B measures a data transmission delay time.

The node B transmits delay time measuring frames $F_T$, i.e., delay time measuring frames $F_{T0}$, $F_{T1}$ respectively onto the transmission paths L0, L1. On the transmission path L1 of system 1, the node A writes data, e.g., "A", of a serial number or address indicative of the node A in a delay time measuring frame $F_{T1}$ which passes through the node A. Similarly, the nodes D, C write data "D", "C" indicative of the nodes D, C, respectively, in the delay time measuring frame $F_{T1}$. When the delay time measuring frame $F_{T1}$ passes through the last node C, therefore, the data "A", "D", "C" have been written successively in the delay time measuring frame $F_{T1}$. The returned delay time measuring frame $F_{T1}$ in which the node serial numbers have been written while being circulated is retrieved by the node B. On the transmission path L0 of system 0, similarly, each time a delay time measuring frame $F_{T0}$ passes through a node, the data of the node are written in the delay time measuring frame $F_{T0}$, and finally the delay time measuring frame $F_{T0}$ with the data "C", "D", "A" written therein is retrieved by the node B.

When the transmitted delay time measuring frames $F_{T0}$, $F_{T1}$ are retrieved, a delay time table of destination nodes and data transmission delay times is generated according to the serial numbers of nodes written in the transmitted delay time measuring frames $F_{T0}$, $F_{T1}$.

Figure 3:
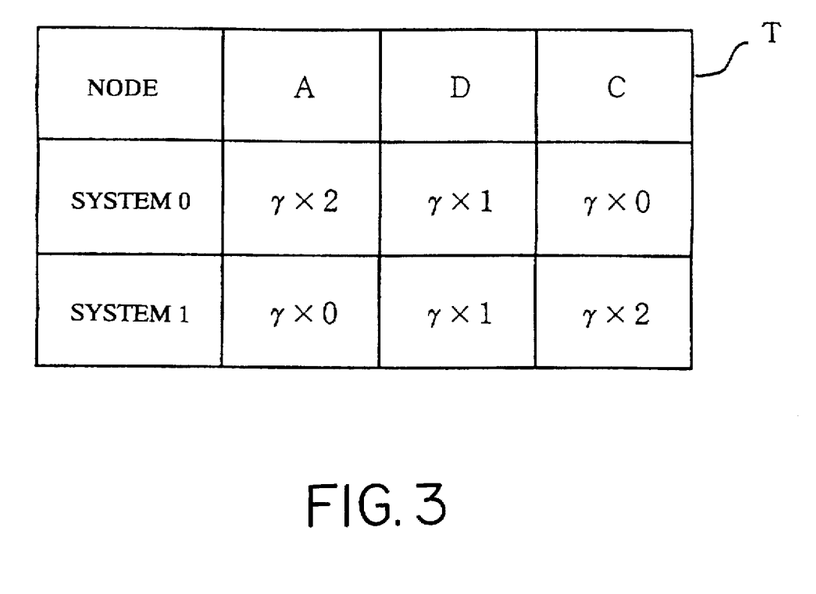
FIG. 3 is a diagram showing a delay time table.

FIG. 3 shows such a delay time table T which is thus generated. In FIG. 3, the delay time table T contains delay times of the nodes except the node B on the transmission paths L0, L1. The delay times are calculated from delay times caused in the nodes through which the delay time measuring frames $F_{T0}$, $F_{T1}$ pass. It is assumed that the nodes are of the same type and the delay times caused in the nodes are the same. Specifically, the delay times caused in the nodes are indicated by "γ", and multiplied by the serial numbers of the nodes as viewed from the node B which transmits the delay time measuring frames $F_{T0}$, $F_{T1}$. For example, inasmuch as the delay time measuring frame $F_{T0}$ passes through the two nodes C, D on the transmission path L0 before it reaches the node A, the delay time of the node A is γ×2 on the transmission path L0. The delay time of the node A is γ×0 on the transmission path L1 because delay time measuring frame $F_{T1}$ passes through no node on the transmission path L1 before it reaches the node A.

The delay times are measured with the delay time measuring frames FT0, FT1 at the respective nodes in every predetermined period of time, i.e., every 30 seconds or 1 minute. Since the delay times are measured and the delays times of the nodes are updated in every predetermined period of time, a latest delay time table T is generated and updated when a node fault such a bypass or the like occurs.

Figure 4:
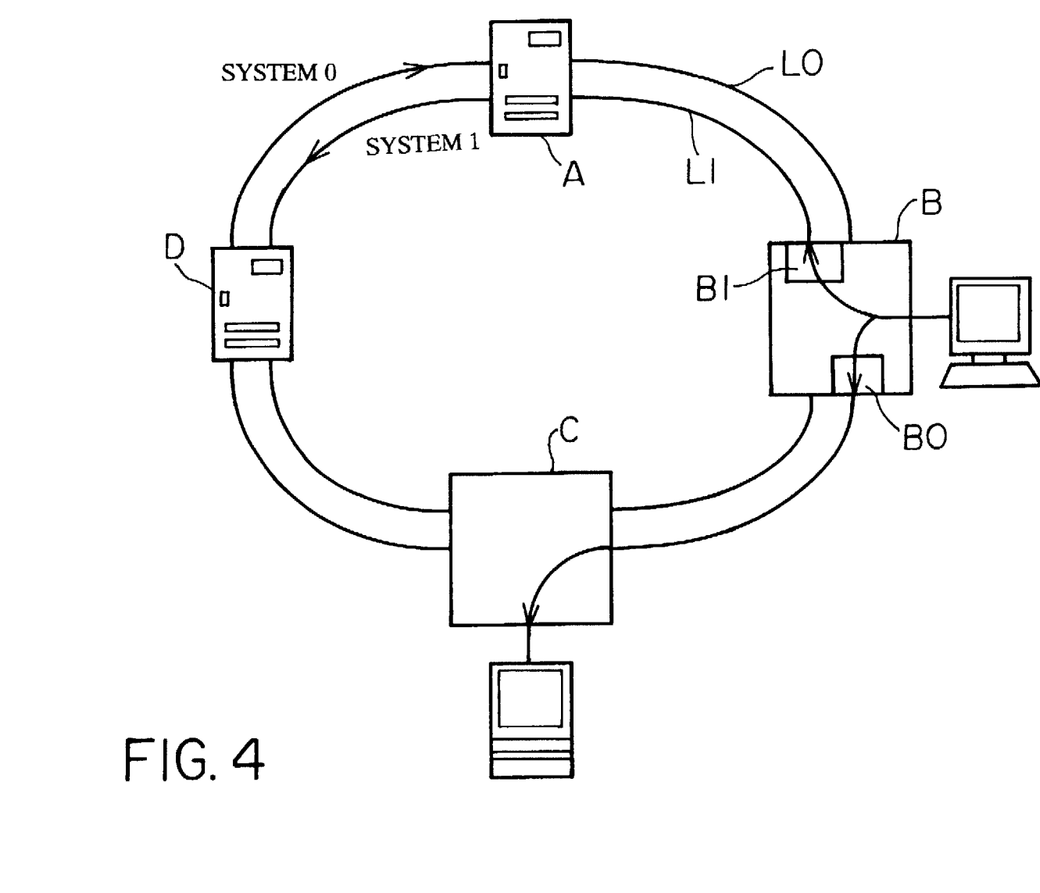
FIG. 4 is a diagram illustrating a process of compensating for a delay time according to a first embodiment of the present invention.

FIG. 4 illustrates a process of compensating for a delay time according to a first embodiment of the present invention. FIG. 4 shows a concept of a method of preventing a double data reception by compensating for a delay time in a transmitting node. Each node has a buffer B0 in its portion for transmitting data to the transmission path L0 of system 0 and a buffer B1 in its portion for transmitting data to the transmission path L1 of system 1. These buffers B0, B1 are controlled to vary the delay times depending on the data destination based on the delay times which are measured with the delay time measuring frames $F_T$.

When data are transmitted from the node B to the node C, for example, the delay times up to the destination node which have been measured at the respective nodes when the data pass over the transmission paths L0, L1 are referred to, and the buffer B0 on the transmission path L0 is given a time delay corresponding to the difference between the measured delay times. Therefore, in view of the difference between the times of arrival of the data at the destination node C when the data are transmitted over the transmission paths L0, L1, the transmitting node B delays the data on the transmission path in which the time of arrival is faster, i.e., the transmission path L0 in FIG. 4, by a time corresponding to the difference between the times of arrival, and then transmits the delayed data. Consequently, the data transmitted over the transmission paths L0, L1 arrive at the destination node simultaneously at all times. Even if the destination node switches between the transmission paths, therefore, no double data reception is caused.

Figure 5:
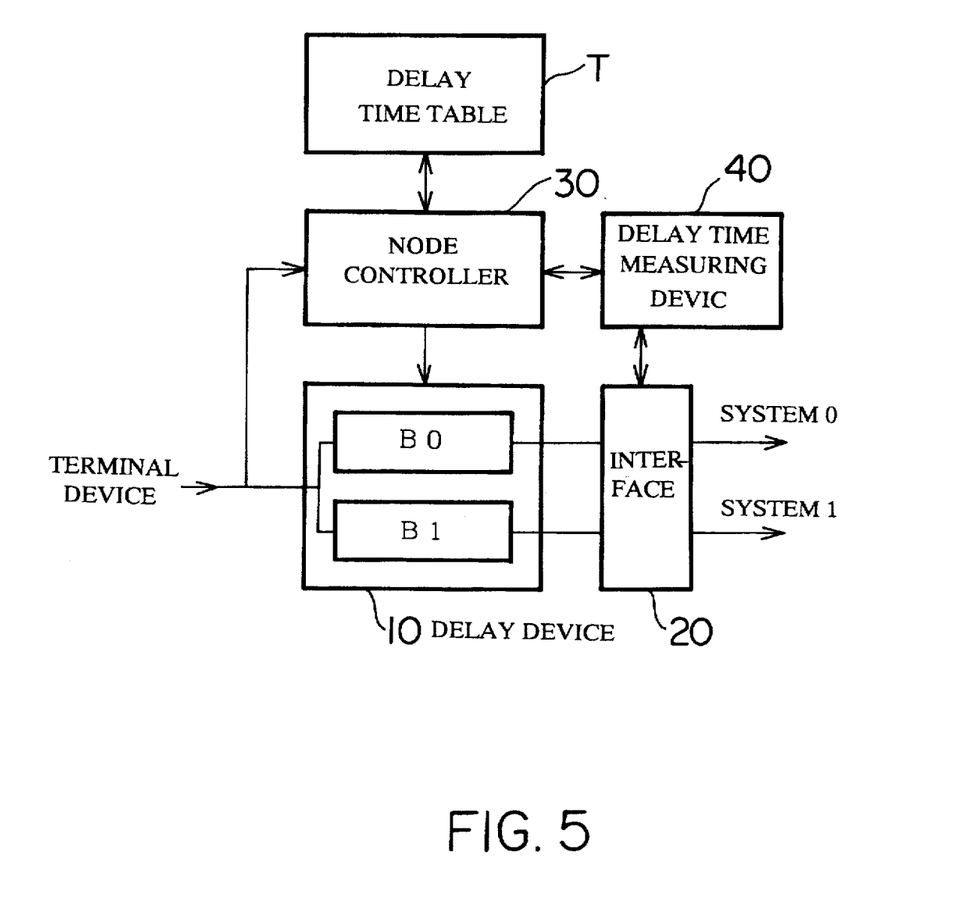
FIG. 5 is a block diagram of a transmitting node for compensating for a delay time.

FIG. 5 shows in block form a transmitting node for compensating for a delay time. The transmitting node for compensating for a delay time has a delay device 10 having two buffers B0, B1 and an interface 20 between a terminal and the transmission paths L0, L1. The node also has a node controller 30 for controlling the node in its entirety, a delay time measuring device 40 for measuring delay times with delay time measuring frames $F_T$ through the interface 20, and a delay time table T for storing delay times measured by the delay time measuring device 40.

The node controller 30 controls the delay time measuring device 40 to measure delay times with respect to a destination node. The delay time measuring device 40 transmits delay time measuring frames $F_T$ (delay time measuring frames $F_{T0}$, $F_{T1}$) through the interface 20 to the transmission paths L0, L1 in every predetermined period of time, and retrieves the delay time measuring frames $F_T$ which have been circulated. The retrieved delay time measuring frames $F_T$ contain successively written data indicative of nodes through which the delay time measuring frames $F_T$ have passed while circulating through the transmission paths L0, L1. The node controller 30 first generates a delay time table T representing times required to transmit data from the transmitting node to the respective nodes, based on the data written in the delay time measuring frames $F_T$ retrieved by the delay time measuring device 40. In following cycles of measuring delay times, the node controller 30 updates the data in the delay time table T into measured inter-node delay times.

For transmitting data from the terminal, the node controller 30 recognizes the address of the destination node from the data to be transmitted, refers to the delay time table T to determine data transmission delay times up to the destination node, and determines the difference between the delay times on the transmission paths L0, L1. The delay device 10 then selects the buffer B0 or B1 on the transmission path which suffers the shorter delay time, based on the determined difference between the delay times, and operates as a delay means for delaying the data by a time corresponding to the determined difference between the delay times. It is assumed that the determined difference between the delay times is of a value produced by subtracting the data transmission delay time on the transmission path L1 from the data transmission delay time on the transmission path L0. If the value is positive, then the delay device 10 controls the buffer B1 to delay the data by a time corresponding to the absolute value of the value. If the value is negative, then the delay device 10 controls the buffer B0 to delay the data by a time corresponding to the absolute value of the value.

Figure 6:
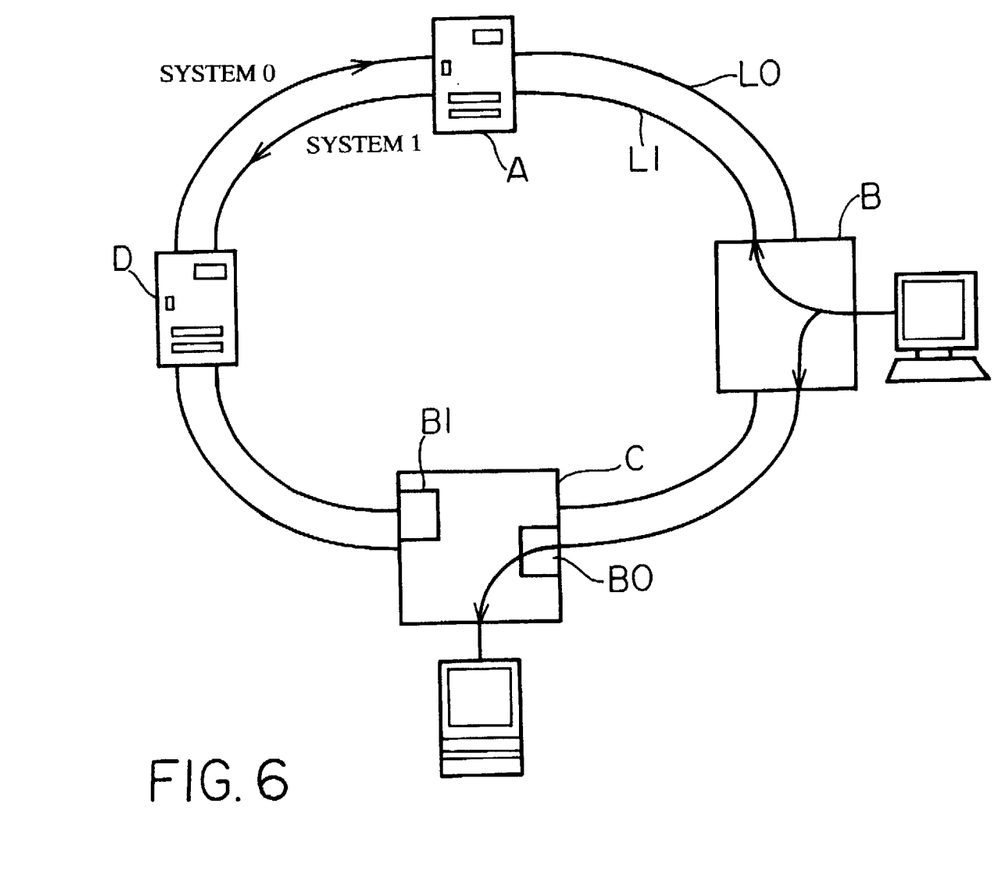
FIG. 6 is a diagram illustrating a process of compensating for a delay time according to a second embodiment of the present invention.

FIG. 6 illustrates a process of compensating for a delay time according to a second embodiment of the present invention. FIG. 6 shows a concept of a method of preventing a double data reception by compensating for a delay time in a receiving node. Each node has a buffer B0 in its portion for receiving data from the transmission path L0 of system 0 and a buffer B1 in its portion for receiving data from the transmission path L1 of system 1. These buffers B0, B1 are controlled to vary the delay times depending on the data transmitting node based on the delay times which are measured with the delay time measuring frames $F_T$.

When data from the node B are received by the node C, for example, the delay times from the transmitting node which have been measured at the respective nodes when the data pass over the transmission paths L0, L1 are referred to, and the buffer B0 on the transmission path L0 is given a time delay corresponding to the difference between the measured delay times. Therefore, immediately before the destination node C switches between the transmission paths, the data which have arrived from the transmitting node B over the transmission paths L0, L1 at the destination node C at different times, reach the terminal at the same time. Even if the destination node switches between the transmission paths, therefore, no double data reception is caused.

Figure 7:
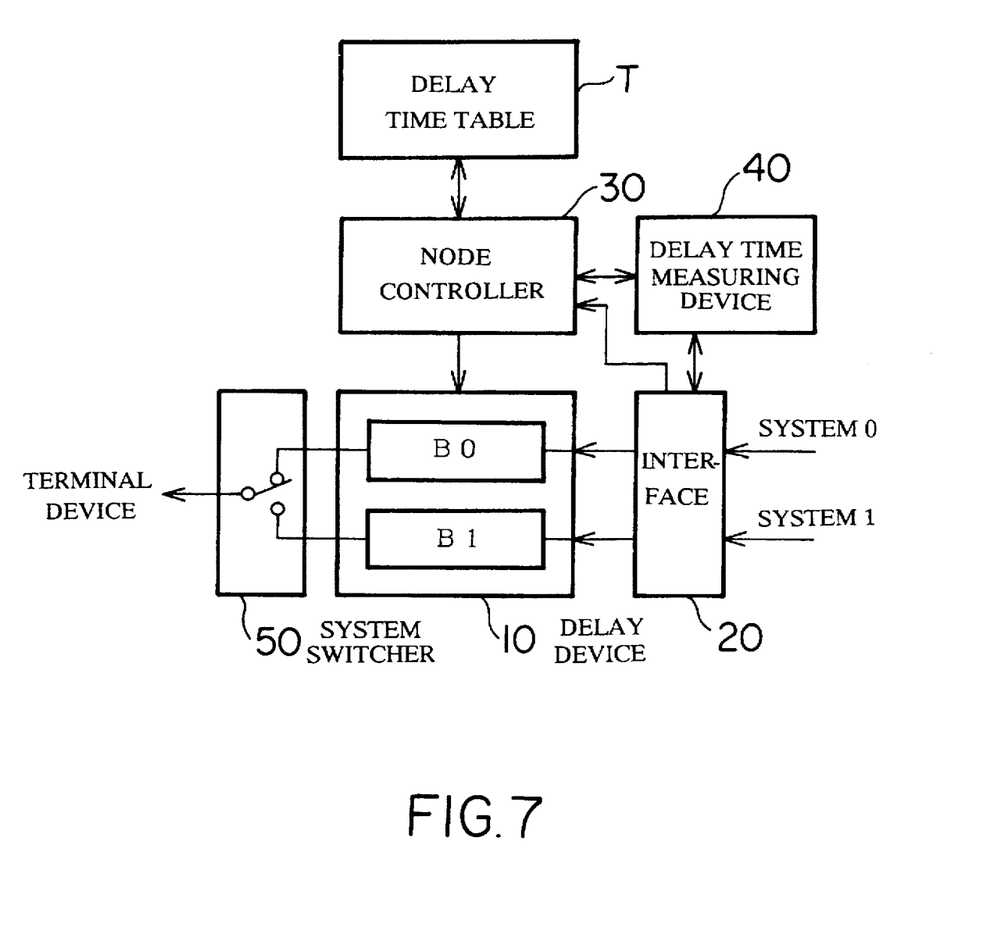
FIG. 7 is a block diagram of a receiving node for compensating for a delay time.

FIG. 7 shows in block form a receiving node for compensating for a delay time. The receiving node for compensating for a delay time has a system switcher 50, a delay device 10 having two buffers B0, B1, and an interface 20 between a terminal and the transmission paths L0, L1. The node also has a node controller 30 for controlling the node in its entirety, a delay time measuring device 40 for measuring delay times with delay time measuring frames $F_T$ through the interface 20, and a delay time table T for storing delay times measured by the delay time measuring device 40.

The node controller 30 controls the delay time measuring device 40 to measure delay times with respect to a transmitting node. The delay time measuring device 40 transmits delay time measuring frames $F_T$ (delay time measuring frames $F_{T0}$, $F_{T1}$) through the interface 20 to the transmission paths L0, L1 in every predetermined period of time, and retrieves the delay time measuring frames $F_T$ which have been circulated. The retrieved delay time measuring frames $F_T$ contain successively written data indicative of nodes through which the delay time measuring frames $F_T$ have passed while circulating through the transmission paths L0, L1. The node controller 30 first generates a delay time table T representing times required to transmit data from the transmitting node to the receiving node, based on the data written in the delay time measuring frames $F_T$ retrieved by the delay time measuring device 40. In following cycles of measuring delay times, the node controller 30 updates the data in the delay time table T into measured inter-node delay times, so that the receiving node has the latest delay time table T at all times.

For receiving data from the transmitting node, the node controller 30 recognizes, at first, the address of the tranmitting node from the data that have been transmitted through the interface 20, refers to the delay time table T to determine data transmission delay times from the transmitting node to the receiving node, and determines the difference between the delay times on the transmission paths L0, L1. The delay device 10 then selects the buffer B0 or B1 on the transmission path which suffers the shorter delay time, based on the determined difference between the delay times, and operates as a delay means for delaying the data by a time corresponding to the determined difference between the delay times.

Figure 8:
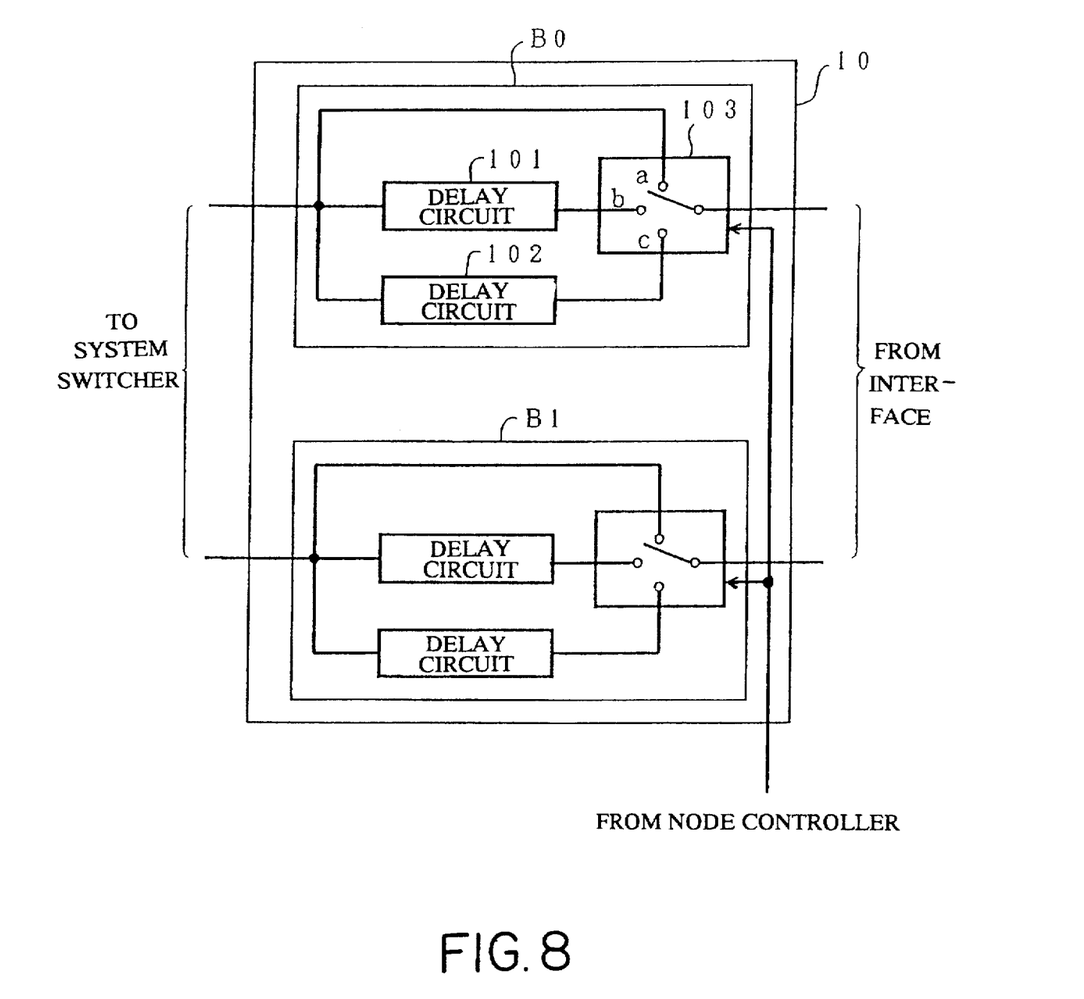
FIG. 8 is a block diagram of a delay device.

FIG. 8 shows the delay device 10 in block form. The delay device 10 shown in FIG. 8 is incorporated in the receiving node in which the delay time is applied to the data. However, the same delay device may be incorporated in the transmitting node in which the delay time is applied to the data. The delay device 10 has two buffers B0, B1 associated respectively with two transmission paths. Since these buffers B0, B1 are identical in structure and operation to each other, only the buffer B0 will be described below.

If the loop-shaped LAN has "n" nodes, then the buffer B0 of the delay device 10 has (n-2) delay circuits. Therefore, in the case where the loop-shaped LAN has four nodes A, B, C, D as shown in FIGS. 4 and 6, the buffer B0 has two delay circuits 101, 102. The delay circuit 101 has a function to produce a delay corresponding to a frame data transmission delay time of one node, and the delay circuit 102 has a function to produce a delay corresponding to a frame data transmission delay time of two nodes. The buffer B0 also has a selector switch 103 for changing delay times.

The selector switch 103 has a fixed contact connected to receive frame data from a transmission path of system 0 in the interface 20 through an input terminal of the buffer B0, three movable contacts "a", "b", "c", and a control terminal for receiving a selection control signal from the node controller 30. The movable contact "a" is connected to a line which bypasses the delay circuits 101, 102. The movable contact "b" is connected to an input terminal of the delay circuit 101, and the movable contact "c" is connected to an input terminal of the delay circuit 102. The line connected to the movable contact "a" and output terminals of the delay circuits 101, 102 are connected together to the system switcher 50 through an output terminal of the buffer B0.

Based on the selection control signal from the node controller 30, the selector switch 103 operates to select either the movable contact "a" to bypass the buffer B0 for communication through no node between the transmitting and receiving nodes, or the movable contact "b" to give a one-node delay time to frame data from the interface 20 for communication through one node between the transmitting and receiving nodes, and or the movable contact "c" to give a two-node delay time to frame data from the interface 20 for communication through two nodes between the transmitting and receiving nodes.

The above embodiments have been described based on the assumption that a data transmission delay time is produced mainly in a node through which data pass, and any delay time on a transmission path is negligible. For measuring a data transmission delay time, determining the difference between delay times, or delaying data which are transmitted over a faster transmission line, the delay time of the transmission line which is about 5 microseconds per kilometer and the system switching time which is 125 microseconds at maximum may be taken into consideration for accurately equalizing the times of arrival of data in both directions at the transmission path switching node.

In the above embodiments, frame data transmission delay times are measured in every predetermined period of time. However, frame data transmission delay times may be measured when the communication system is newly operated, a node is added, or switching between the transmission paths or node bypassing is carried out due to a fault.

With the present invention, as described above, frame data which have been transmitted over a plurality of transmission paths arrive substantially simultaneously at a receiving node when the data are selected for reception. Therefore, even if a transmission path over which the frame data are transmitted or a node through which the frame data transmission delay times are measured suffers a fault, and another transmission path is selected to receive the frame data from the selected transmission path, no identical data are received twice before and after switching between the transmission paths is effected. Consequently, any double data reception is prevented from occurring.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of preventing a double data reception from occurring in a selective reception loop-shaped network having at least first and second transmission paths running in opposite directions along the loop-shaped network to connect nodes including a transmitting node and a receiving node, for transmitting frame data from the transmitting node over the first and second transmission paths, and selectively receiving the frame data from one of the first and second transmission paths at the receiving node, said method comprising the steps of:

(a) establishing a first delay time between the sending node and the receiving node over the first transmission path and a second delay time between the transmitting node and the receiving node over the second transmission path;

(b) comparing the first delay time with the second delay time and calculating a difference delay time therebetween; and (c) if the first delay time is greater than the second delay time, giving the difference delay time to the second transmission path to increase a data transmission delay time thereof, and if the first delay time is smaller than the second delay time, giving the difference delay time to the first transmission path to increase a data transmission delay time thereof, so that the frame data sent from the transmitting node over the first and second transmission paths will arrive at the receiving node substantially simultaneously.

2. A method according to claim 1, wherein said first and second delay times are determined based on the number of nodes on the first and second transmission paths, respectively.

3. A method according to claims 1 or 2, wherein said establishing the first and second delay times in step (a) comprises the steps of (a1) transmitting delay time measuring frames from the transmitting node over said first and second transmission paths, and (a2) measuring the first and second delay times by analyzing the delay time measuring frames returned to the transmitting node.

4. A method according to claim 3, wherein said measuring the first and second delay times in step (a2) comprising the steps of (a2A) writing in the delay time measuring frames data indicative of nodes through which said delay time measuring frames pass over the first and second transmission paths, (a2B) retrieving the delay time measuring frames which have been circulated through the first and second transmission paths, and (a2C) generating a delay time table indicative of delay times between the nodes.

5. A method according to claim 3, wherein said measuring the first and second delay times in step (a2) is carried out in every predetermined period of time.

6. A method according to claim 1, wherein said giving the difference delay time step (c) is carried out in the transmitting node.

7. A method according to claim 1, wherein said giving the difference delay time in step (c) is carried out in the receiving mode.

8. A node for use in a selective reception loop-shaped network having at least first and second transmission paths running in opposite directions along the loop-shaped network to connect a transmitting node and a receiving node, for transmitting frame data from the transmitting node over the first and second transmission paths, and selectively receiving the frame data from one of the first and second transmission paths at the receiving node, comprising:

delay time data memory means for storing a first delay time between the sending node and the receiving node over the first transmission path and a second delay time between the transmitting node and the receiving node over the second transmission path;

difference calculating means for comparing the first delay time with the second delay time stored in said delay time data memory means and calculating a difference delay time therebetween; and delay time control means for giving the difference delay time to the second transmission path to increase a data transmission delay time thereof if the first delay time is greater than the second delay time, and giving the difference delay time to the first transmission path if the first delay time is smaller than the second delay time, so that the frame data sent from the transmitting node over the first and second transmission paths will arrive at the receiving node substantially simultaneously.

9. A node according to claim 8, further comprising delay time measuring means for transmitting delay time measuring frames from the transmitting node over said first and second transmission paths and measuring the first and second delay times by analyzing the delay time measuring frames returned to the transmitting node.

* * * * *